C. TYSON.
SCREW SOLING MACHINE FOR UNITING THE UPPERS AND SOLES OF BOOTS AND SHOES.
No. 177,772. Patented May 23, 1876.
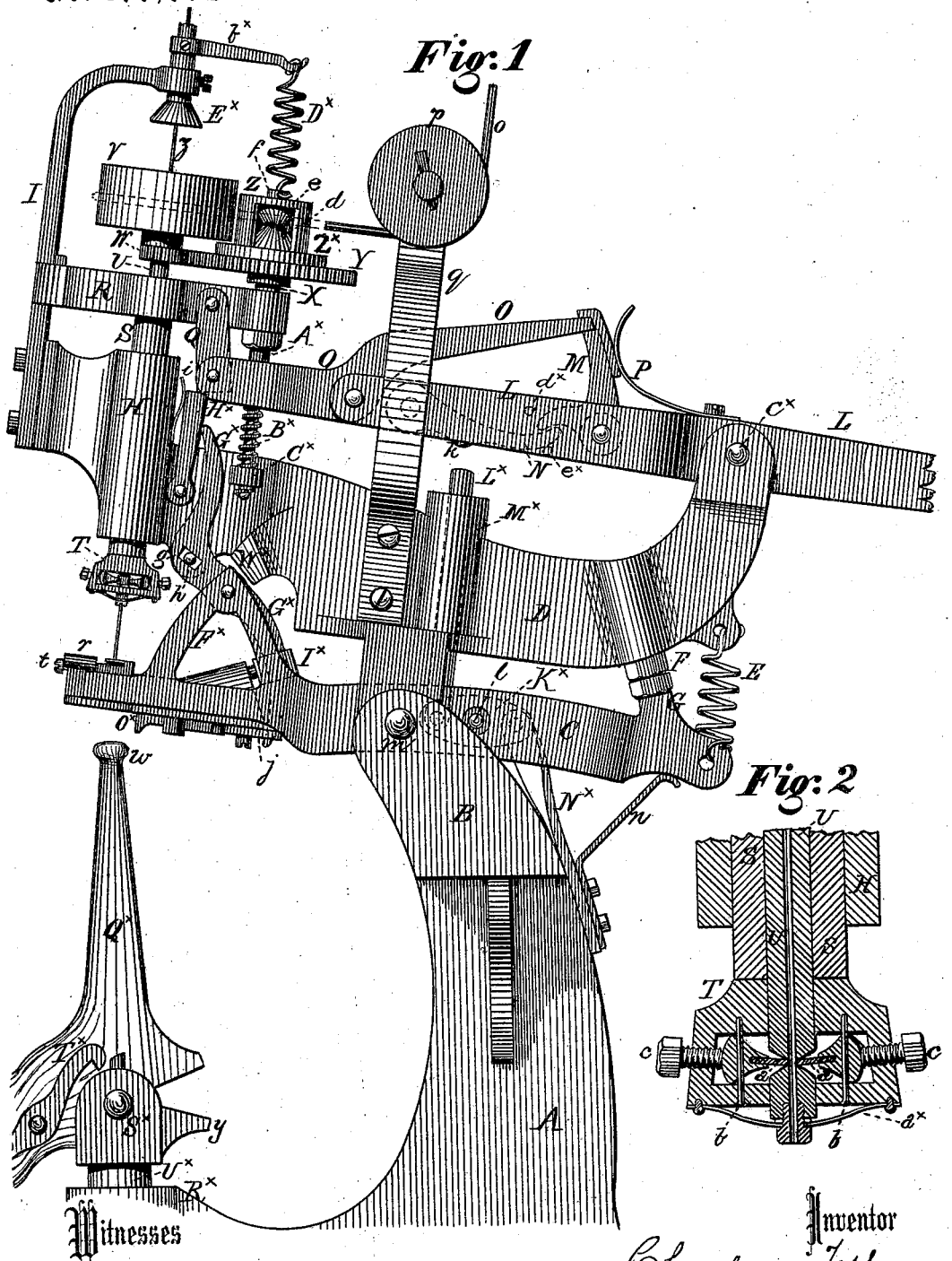

C. TYSON.
SCREW SOLING MACHINE FOR UNITING THE UPPERS AND SOLES OF BOOTS AND SHOES.

No. 177,772. Patented May 23, 1876.

C. TYSON.
SCREW SOLING MACHINE FOR UNITING THE UPPERS AND SOLES OF BOOTS AND SHOES.

No. 177,772.

Patented May 23, 1876.

Witnesses
W. R. Wright
Owen Darcy

Inventor
Charles Tyson
by J. Bonsall Taylor, Attorney

C. TYSON.
SCREW SOLING MACHINE FOR UNITING THE UPPERS AND SOLES OF BOOTS AND SHOES.

No. 177,772. Patented May 23, 1876.

UNITED STATES PATENT OFFICE.

CHARLES TYSON, OF PHILADELPHIA, PENNSYLVANIA.

IMPROVEMENT IN SCREW-SOLING MACHINES FOR UNITING THE UPPERS AND SOLES OF BOOTS AND SHOES.

Specification forming part of Letters Patent No. 177,772, dated May 23, 1876; application filed April 15, 1876.

*To all whom it may concern:*

Be it known that I, CHARLES TYSON, of the city and county of Philadelphia, in the State of Pennsylvania, have invented certain new and useful Improvements in Screw-Soling Machines for Uniting the Soles and Uppers of Boots and Shoes, of which I hereby declare the following specification to be a full, clear, and precise description, and sufficient to enable those skilled in the art to which my invention appertains to construct and employ a machine embodying it, reference being had to the accompanying drawings, which form part of this specification.

My invention relates to that class of machines which, in the manufacture of boots and shoe, unite the soles to the uppers by means of screws cut upon and from a continuous wire, and in which the screw simultaneously with the cutting of its threads is entered into the material to be united, and then is severed when in place; and has for its principal objects, first, a machine of the class above recited, so organized that both the several and the combined actions of its component mechanism are proportionately more quickly performed when the pieces of material presented for union are thin than when they are thick, to the end that more thin material can be united in a given time than thick—a result never before attained in a screw-soling machine; second, a machine of the class above recited, so constructed as not only to regulate automatically the pitch of the threads cut upon the wire, but also the rapidity of entrance of the wire so under regulation, cut with threads into the material to be united; and, third, a thoroughly effective machine of the class above recited, comparatively so radically compact, simple, and cheap of construction, by reason of the limited number and extreme simplicity of its distinct parts, as to possess material advantages over the very intricate and costly mechanisms at present in use for the same purpose; to which ends, among others, it consists of the screw-soling machine hereinafter described and claimed.

Figure 3:
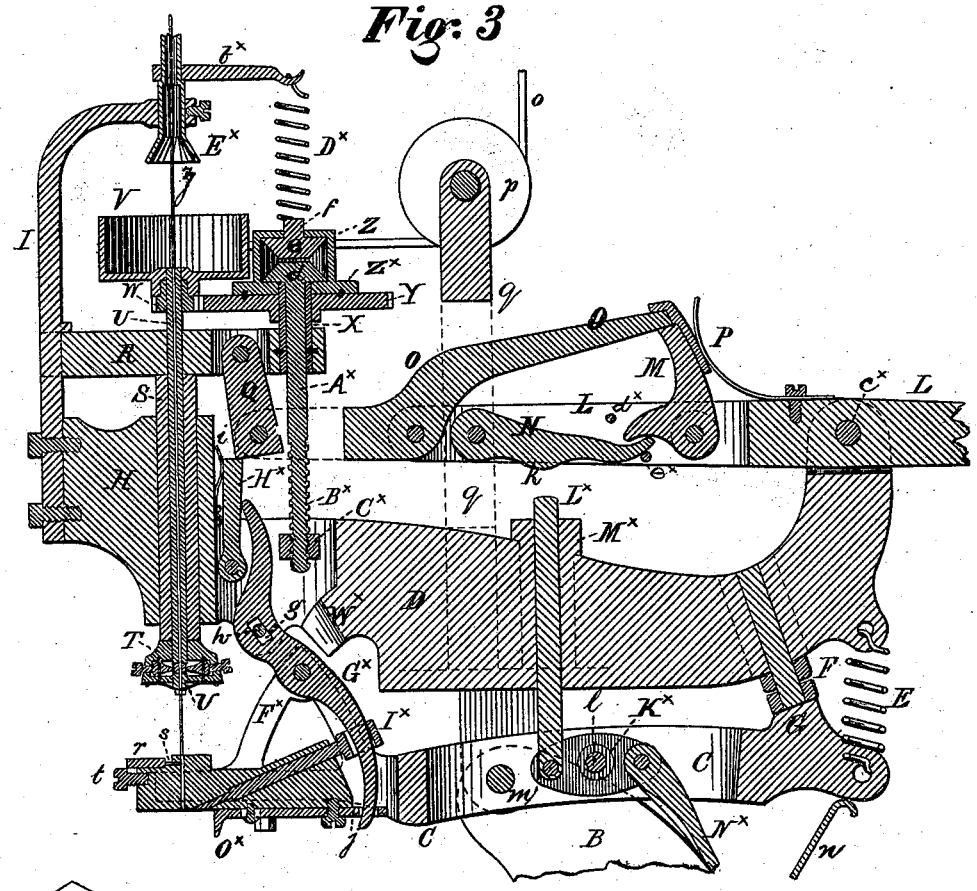
Figure 4:
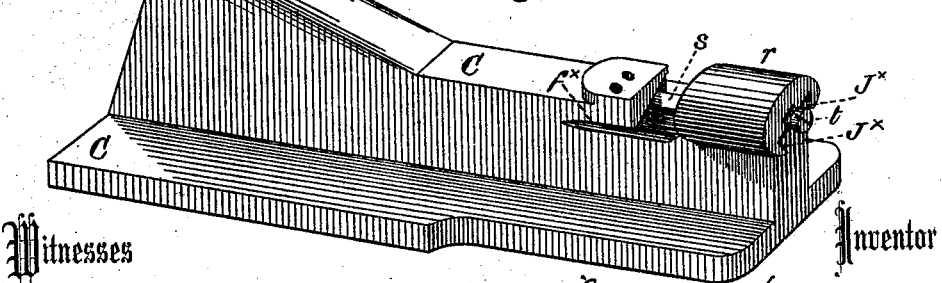
Figure 5:
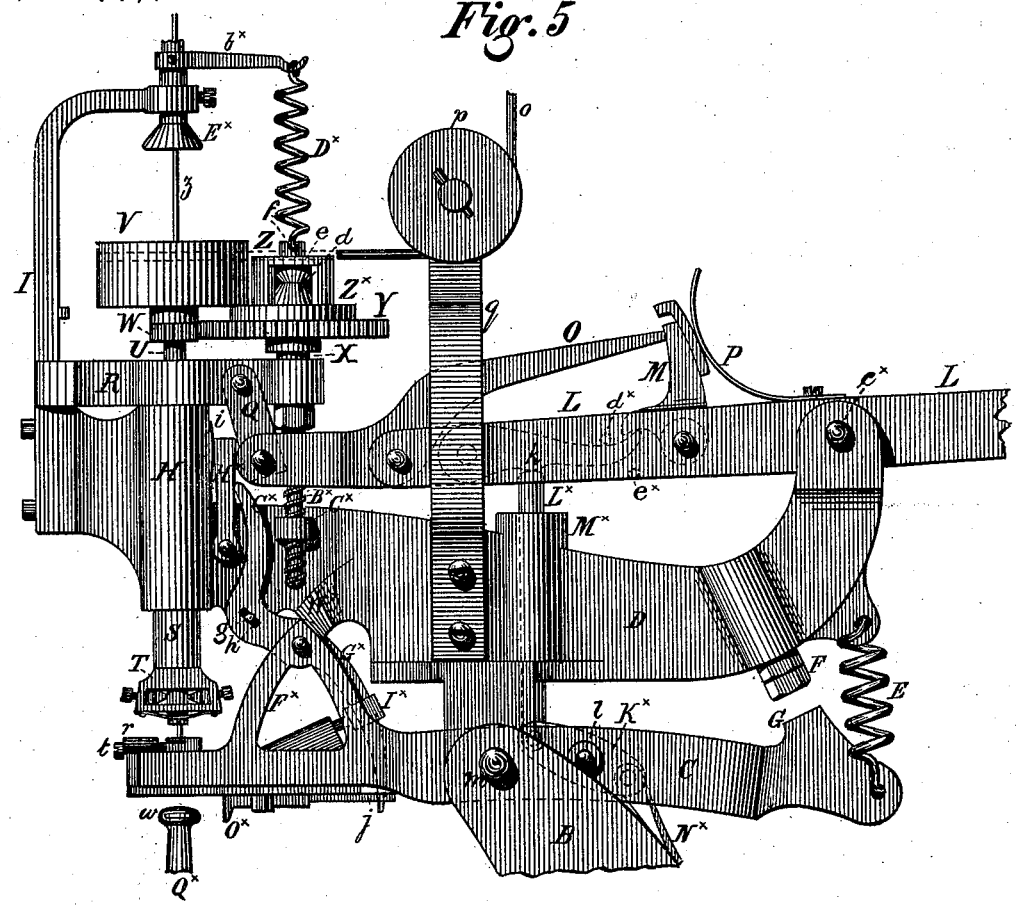
Figure 6:
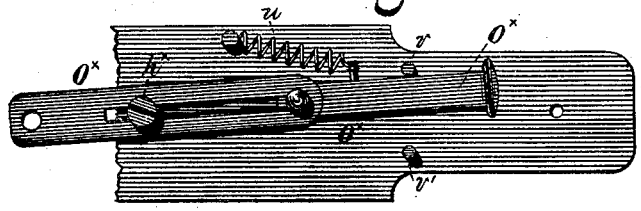
Figure 7:
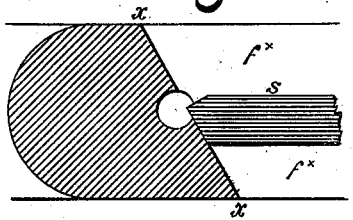

Of the drawings, which illustrate a machine embodying my invention, Figure 1 is a partial side elevation with the mechanism set for action; Fig. 2, a sectional detail of the segmental stud-frame and attachments; Fig. 3, a partial central sectional elevation with the mechanism set for action; Fig. 4, a perspective of the nose, or forward part of the nose-lever, of the cut-off, chaser, and chaser-cap; Fig. 5, a partial side elevation of the mechanism, after action and before reaction, at the time when the wire has been completely entered through the material; Fig. 6, a bottom plan of a portion of the feed-gage beneath the nose-lever; Fig. 7, a plan detail of the chaser; and Fig. 8, a perspective of the entire machine set for action.

Similar letters of reference indicate corresponding parts in all the figures.

Figure 8:
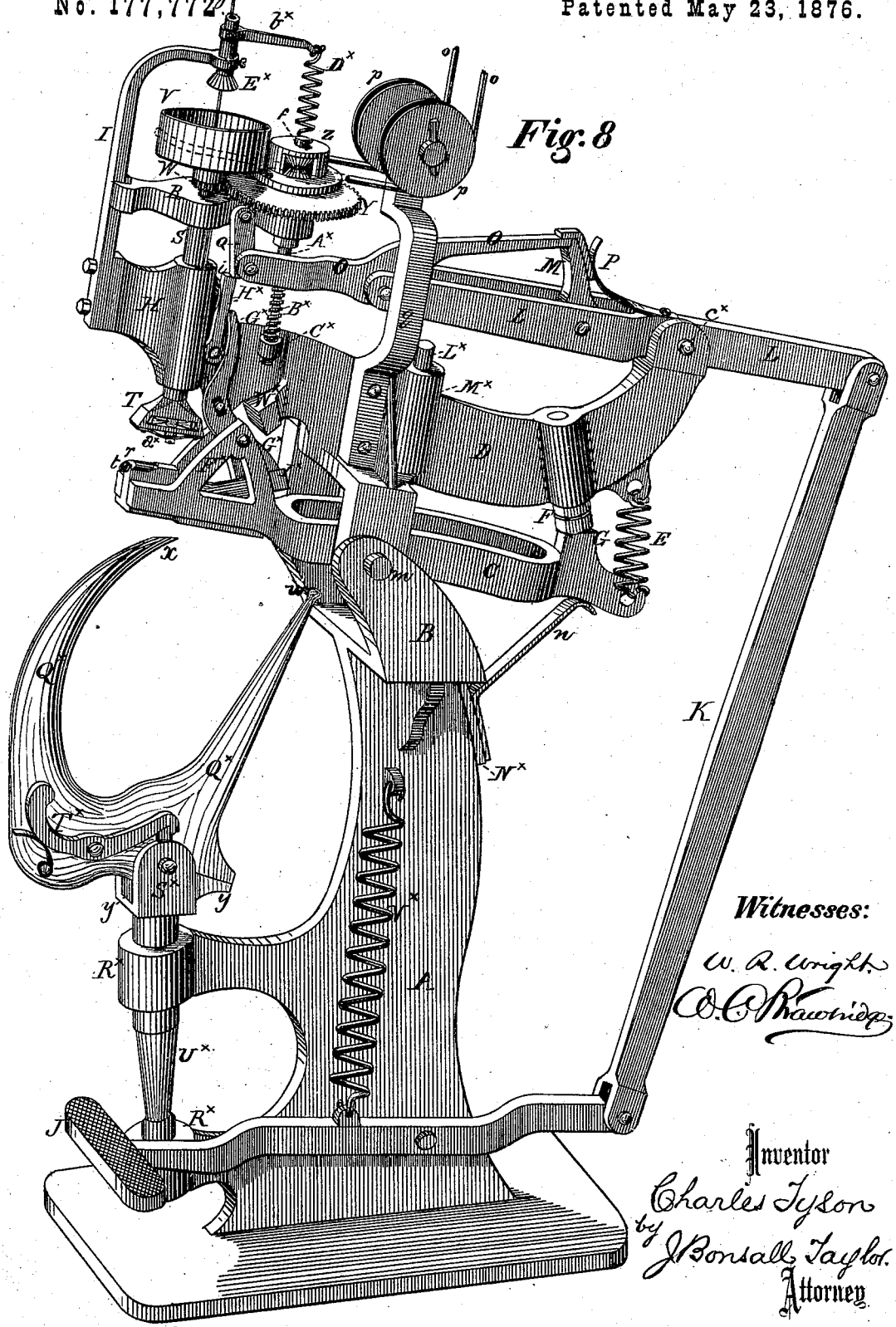

With reference to the drawings, the mechanical construction of my invention is as follows:

A is the base or fixed standard of the machine, branching laterally at top into two supplemental standards, B B, between which are pivoted the nose-lever C and the main frame D, which latter are yieldingly held in close contact by the coiled spring E, connecting them at their rear ends, the point of contact when at rest being between an adjustable boss, F, upon the frame and a stop, G, upon the nose-lever. The foremost end of the nose-lever carries the cut-off feed-gage and chaser, whereof hereafter. The foremost end of the frame D terminates in a vertical sleeve, H, to which is attached a carrier-guide, I. J is a treadle pivoted to the standard, held up, when the mechanism is at rest, by the coiled spring $V^x$, and operating to elevate a treadle-rod, K, the upper extremity of which is jointed to the latch-lever L. The latch-lever is pivoted within the forked rear extremity of the frame D, which latter is bent up to receive it, in the manner shown. Forward of its fulcrum $c^x$ the latch-lever is bifurcated to receive the latch M, latch-trip N, and carrier-lever O. In a position of rest before action, a spring, P, forces the latch to engage the free end of the carrier-lever, effecting an unbroken line of continuous rigidity along the latch-lever and carrier-lever, as shown in Figs. 1, 3, and 8. $d^x$ and $e^x$ are stops for the latch-trip. A link, Q, connects the free forward end of the carrier-lever O with the carrier R, the latter being at right angles to the frame-sleeve H, its foremost portion embracing the guide I to prevent rotation, its rear portion carrying and supporting the major part of the differential regulating-pitch and speed-gearing, hereinafter to be described, while its central portion is rigidly affixed to a hollow cylindrical stem, S, which passes down through, is free to reciprocate within the frame-sleeve H, and abuts below upon the segmental stud-frame T, as shown in Fig. 2. Passing through, and adapted to rotate within, the stem S is the wire-containing spindle U, to the upper end of which are keyed the driving-pulley V (the same deriving its rotation from a belt, $o$, passing over groove-wheels $p\ p$, supported upon a standard, $q$, secured to the frame D, and vibrating with the frame, to keep the driving-belt taut whatever be the vertical position of the wire-spindle) and the pinion W, and to lower end of which is attached the segmental stud-frame T. (Shown in detail in Fig. 2.) This frame is of approximately rectangular construction, and contains the wire-griping studs $a\ a$, loosely retained in position by pins $b\ b$, made adjustable to take up wear or slack by set-screws $c\ c$, passed inward to the wire through perforations in the spindle, and roughened or sharpened at their inner ends, so as to seize the wire. A spring, $a^x$, affixed to the base of the wire-containing spindle U, acts up against the bottom of the stud-frame, to keep it constantly elevated at such times as no downward pressure is exerted upon it by the stem S, and thereby acts to loosen completely the gripe of the studs $a\ a$ upon the wire by active pressure constantly existing to such end, but only permitted to operate at the required moment—$i.\ e.$, when the downward pressure upon the stud-frame ceases.

To the rear portion of the carrier is secured the regulating-spindle sleeve X, concentric with and upon which sleeve, above the carrier, is mounted and rotates the gear-wheel Y, upon, fastened to, or making part of, and concentric with, which gear-wheel is the cage Z. Fitted within, and passing down through, the sleeve X is the regulating-spindle $A^x$, whose conically-truncated head $d$ is inclosed within the cage Z, and whose lower portion is cut with screw-threads $B^x$, and passed through a fixed nut, $C^x$, secured to, or formed within, the frame D. Also, inclosed within the cage Z, immediately above the spindle-head $d$, and concentric with it, is a similar head, $e$, but placed in reverse position, whose shank $f$ passes up through an opening in the top of the cage, and is connected with a spiral spring, $D^x$, depending from an arm, $b^x$, branching laterally out from the wire-guide cap, $E^x$, which latter is secured to the carrier-guide I, and is concentrically above the hollow driving-pulley V, all substantially as shown.

$F^x\ F^x$ are supports formed upon the forward portion of the nose-lever C, and between which is pivoted the crooked actuating-lever $G^x$, the upper portion of which is slotted at $g$, to receive a pin, $h$, fixed upon the frame D, while its extreme upper end, when the mechanism is at rest, touches lightly a detent, $H^x$, pivoted to the frame D, and held out from the sleeve H by a spring, $i$, in such manner as to engage beneath and support the link Q. The lower portion of the lever $G^x$ passes through the head of the cut-off $I^x$, and its extreme lowermost end through the sliding bar $j$ of the feed-gage. Within and across an opening in the nose-lever C is pivoted at its center, by the pin $l$, the double-ended trip-lever $K^x$, the foremost end of which upholds the trip-pin $L^x$, which passes loosely up through a sleeve, $M^x$, in the frame D, and terminates in line below a knob, $k$, upon the latch-trip N, being made adjustable in its length by any convenient means, while the rearmost end is pivotally secured to a detaining-bar, $N^x$, rigidly affixed to the main standard of the machine. The distance from the center of the pin $l$ of the trip-lever $K^x$ to the center of the pivot-pin $m$ of the nose-lever C is one-fourth of the distance from the center of the pivot $m$ to the center of the hole in the nose-lever through which the wire passes; and the trip-lever $K^x$ is itself even-ended, and fulcrumed at $l$ at its exact center, so that it follows, as of course, that a descent, for example, of four inches by the center of the nose of the nose-lever until contact with the horn will raise the pivot $l$ of the trip-pin one-fourth of such distance—$i.\ e.$, one inch—while the oscillation or rise of the forward end of the trip-lever (held down at its rear end by the detaining-bar $N^x$) will be a multiple of the rise of the pivot $l$, or double such rise, whence it follows that the trip-pin $L^x$ rises exactly one-half of the distance of the free descent of the nose of the nose-lever, until the latter encounters, and is arrested by, the stock, whatever or however varying such descent may be, which descent is regulated wholly by the thickness of the stock itself.

Now, the knob $k$ upon the latch-trip N is precisely at the central point between the fulcrum of the latch-lever L at $c^x$, within the upturned end of the frame D, and the axial line of the link-connection Q between the forward end of the carrier-lever O and the carrier R, whence it results that the free descent of the carrier, and consequently of the wire griped within the stud-frame, until the horn-surface is reached by the wire, will be precisely double the descent of the knob $k$, so that the knob comes into contact with the trip-pin to terminate the further screw cutting and inserting action of the machine, and operate the cut-off, as is hereinafter described, at the very moment that the screw is entered completely through the stock, whatever the thickness of such stock may be, effectuating the first principal object of this invention. $n$ is a bracket upon the main standard $A^x$, to arrest the reaction of the mechanism by preventing more than a given rocking of the nose-lever to the rear. $r$ is a chaser-cap, fitted obliquely, by means of gains $J^\times$, over a beveled surface formed on the top front of the nose-lever, and constructed to inclose beneath it and against said surface, and maintain in an oblique position, the chaser $s$. The cap is controlled by a set-screw, $t$, acting to press the chaser $s$ up against the wire to cut the threads upon the same, the obliquity of the beveled surface regulating the pitch of the chaser, and consequently that of the thread cut upon the wire, while one beveled surface piece of a given inclination with its gains may be made removable, as shown in Fig. 8, to be replaced by another of a different inclination when an altered pitch is desired. The front surface of the chaser $s$ is of any given but of invariable obliquity, as indicated in Fig. 7 by the line $x$ $x$, which represents the back line of the channel $f^\times$, so that a mere tightening of the set-screw will serve to set up the chaser against the back of such channel when resharpened, obviating the necessity of any nice adjustment by skilled labor, inasmuch as the back of the channel is of the exact obliquity of the chaser itself. The chips escape through the channel. $O^\times j$ is the feed-gage; $O^\times$, a toothed-face vibrating piece, adjustable as to its length by a screw, $h^\times$, pivoted beneath the forward end of the nose-lever to a sliding guide-bar, $j$, located between two studs, $v$ $v'$, and thrown forward or back by the lever $G^\times$.

Its action is as follows: Until the nose-lever is brought down to bear upon the stock upon the horn, the gage-bar $O^\times$ is up against the stock, retaining it in proper position; but so soon as the link is released to set the screw in motion the gage is drawn back by the lowermost end of the lever $G^\times$, and, when once free from the stock, is drawn over by the spring $u$ against the stud $v$. When the reaction takes place the gage is again pressed forward against the stock, so that the operator can move it laterally as far as the gage-stud $v'$ will permit. The gage thus serves to regulate the distance of the screws from each other, and also from the edge of the stock, by the adjustment in the gage $O^\times$ itself by means of the screw $h^\times$. $Q^\times$ is a double-surfaced one-piece work-supporting horn, (best shown in Fig. 8,) journaled, in bearings $R^\times$ $R^\times$, to the fixed standard $A$, and pivoted at $S^\times$ to a rotating upright, $U^\times$, in such a manner that the same deflection which throws its heel-piece $w$ completely out of plane beneath the advancing wire screw in the nose-lever will throw the sole-piece $x$ into plane, and vice versa, at one and the same action, utilizing for exact stoppage the shelves $y$ $y$ upon the rotating upright.

$T^\times$ is a spring lock-piece to secure the horn in the position shown in Fig. 8—that is to say, when the sole-piece $x$ is up, for the preponderance of metal upon that side, when down, obviates the necessity of a lock in such position.

$z$ is the wire employed to form the screw. $W^\times$ is a stop upon the main frame $D$, so placed as to encounter the top of the supports $F^\times$ upon the nose-lever $C$, and check the forward rocking of the frame at the desired point, whereof hereafter.

Such being the mechanical detail of the most conveniently-constructed machine embodying my invention, the mode of operation of such machine is the following: Before starting, a straight piece of wire ten or twenty feet long is passed down through the guide-cap $E^\times$ and hollow spindle $U$, and the motive power then applied to the driving belt $o$, so as to rotate rapidly the driving-pulley $V$, pinion $W$, wire-containing spindle $U$, and its stud-frame $T$. The pinion $W$, meshing, as it does, with the gear-wheel $Y$, rotates the latter and its cage $Z$ freely upon the spindle-sleeve $X$.

A depression of the treadle $J$ expands the spring $V^\times$ and elevates the treadle-rod $K$, which, in turn, elevates the rear end of the latch-lever $L$, (the latter being, at starting, in rigid connection with the carrier-lever $O$ through the medium of the latch $M$,) while the carrier-lever is propped up in front by the detent $H^\times$. Necessarily, therefore, the action of the treadle is to rock the main frame $D$ and attachments forward about its pivot $m$, and with it, by virtue of the spring $E$, the nose-lever $C$, until the nose or pressing-surface of the latter comes into contact with the stock upon the horn $Q^\times$, when the further forward descent of the nose-lever $C$ is arrested. The pressure, however, upon the treadle continuing, the frame $D$ is rocked still farther forward, expanding the spring $E$, which, at the rear, yieldingly connects it to the now rigid lever $C$, until, first, its descent deflects the crooked lever $G^\times$, and forces the upper end of that lever against the detent $H^\times$, (and this because the lever $G^\times$ is pivoted to both nose-lever and frame, the pivot $h$ upon the frame playing within the slot $g$ in the lever, and thus permitting deflection,) to trip it from under, and thereby release the link $Q$ and carrier $R$, as shown in Fig. 5, and until, second, its descent is arrested by the contact of its stop $W^\times$ with the support $F^\times$ and $F^\times$ upon the nose-lever.

During the first descent of the nose-lever $C$ the trip-pin $L^\times$ is raised by the oscillation of the trip-lever $K^\times$, such oscillation directly resulting from the relative position of the trip-lever $K^\times$, fulcrumed within the nose-lever $C$, and from the rigid connection of said trip-lever, through the detaining-bar $N^\times$, with the standard $A$, and its extent (and consequently thereupon the height to which the trip-pin is elevated) depending wholly upon the distance of the free descent of the forward portion of the nose-lever $C$, for it will be readily comprehended that stock of the thickness of an inch placed upon the horn will arrest the descent of the nose-lever sooner than stock of the thickness of a half inch, and in ratio to the distance passed over by the nose of the nose-lever in descending, until encounter with the stock, will be the distance to which the trip-pin $L^\times$ is raised, all as hereinbefore fully exemplified; and all this, again, to the end that the operative action of the whole machine may be checked instantly, in the manner described, when the screw has been entered completely through the material to be united, the time occupied for the whole action of the machine being proportionately less for a thin piece of material than for a thick.

When the link Q has been released from the detent $H^\times$ by the action of the lever $G^\times$, as before described, the downward pressure upon the treadle, still continuing, acts, so long as the latch-lever L and carrier-lever O continue locked, to press down the carrier R, forcing its stem S down through the frame-sleeve H upon the stud-frame T, and thereby throwing the studs $a\ a$ within the frame into bite with the wire, causing it to rotate with the frame.

The same downward pressure of the carrier-stem S upon the stud-frame T forces the stud-frame itself down, the latter carrying down with it the wire-containing spindle U, pinion W, and pulley V, all of which are fastened to it, until the lower face of the driving-pulley V impinges upon the upper face of the rim $Z^\times$ of the cage Z, and thereby depresses the cage and gear-wheel Y, whereby the roughened truncated heads $e$ and $d$ within the cage are brought into close frictional union, and, as a result, the regulating-spindle $A^\times$, now a part of the gear-wheel Y, is screwed through the nut $C^\times$, thus regulating most effectually the rapidity of descent of the wire through the nose-lever, in which it encounters the chaser and receives its thread, and the pitch of threads cut upon the same.

The theory of regulation of rapidity of descent, and of the pitch, is this: The threads $B^\times$ upon the regulating-spindle $A^\times$ are conveniently cut two turns to the inch, while the gear-wheel Y is in ratio to the pinion W as ten is to one. It follows, therefore, as a direct result of such differential gearing, that one complete turn of the spindle and gear-wheel will turn the pinion and wire ten times, giving ten threads to the half-inch descent, or twenty to the inch. The relative diameter of the gear-wheel and pinion may, however, be varied, to vary the number of threads, and their consequent pitch upon the wire; or the spindle and its nut may, instead, be cut with any number of turns to the inch to effect the same result, so that a set of removable spindles and nuts of different pitch may be employed in the same machine.

It will also be observed that the same pressing force of carrier and stem which is applied to gripe the wire for chasing is also applied to insert the wire, when chased, into the stock—a most material point in simplicity and directness of action.

It will likewise be observed that no blank is left upon the wire, but that its whole length is evenly cut with threads, although they are not all cut continuously, for the reason that the wire, after rotating, remains at rest against the chaser, in position, when again seized, to have the same thread cut still farther along the old line and pitch.

As soon as the now screw-threaded wire shall have been completely passed through the material to be united, by the relative adjustment of the trip-pin $L^\times$ to rise to a height proportionate to the descent of the nose-lever, as before described, the knob $k$, upon the heretofore-descending latch-trip N, will have been brought down into striking contact with the trip-pin $L^\times$, so as to throw the latch-trip up against the forked base of the latch M, compressing its spring P, and deflecting the latch laterally backward until it is out of clutch with the rear end of the carrier-lever, releasing the latter, and at once breaking the line of continuous rigidity heretofore existing in the action between the latch-lever and the carrier-lever, while at the same time, and as a sequence of the broken line of levers, checking the further descent of the carrier and carrier-stem, ending the pressure of the latter upon the stud-frame, and, finally, the bite of the studs upon the wire, so that the wire remains for the time unrotating and at rest.

The moment after the latch-trip N has released the latch M from the carrier-lever O it encounters the fixed stop $d^\times$ within the bifurcated end of the latch-lever, and in so doing becomes for the time being rigid between the stop $d^\times$ itself above and the line of connection through the trip-pin, trip-lever, detaining-bar, and standard below, whereupon any further pressure upon the treadle ceases to depress it, for such pressure merely acts around a series of now rigid parts—i. e., up the treadle-rod, and through the latch-lever down on the stop $d^\times$, itself braced down against the latch-trip, now rigid, as above described. And it will be readily comprehended that this stoppage of the treadle will occur invariably at the moment when the wire screw is cut off by the above-described dual and compensating function of the latch-trip and its adjusting devices. The pressure being now taken off from it, the treadle is abandoned to the contraction of its spring $V^\times$, which draws it up again into position for a second stroke, while in so doing drawing down the rear end of the latch-lever, and thereby locking the latch once more upon the carrier-lever, re-establishing the line of continuous rigidity along the latch-lever and carrier-lever, whereupon the carrier-lever presses up upon the link, the link up upon the carrier, raising the latter, its stem, the wire-containing spindle, stud-frame, pinion, and band-wheel, the band-wheel in rising ceasing to impinge upon the face of the cage, thereby permitting the spring $D^\times$ to contract and draw up the reversed head $e$ by its shank $f$, thus ending its frictional union with the spindle-head $d$, and consequently permitting the unscrewing of the regulating-spindle $A^\times$ from out its nut $C^\times$, as the spindle is itself carried up by the cage Z and gear-wheel Y in the rise of the carrier R, the gear-wheel and cage once more rotating freely about the spindle-stem X. When the carrier and link have risen to sufficient height the detent-spring $i$ throws the detent $H^\times$ out into position beneath the link Q, once more propping the latter up, and setting the upper portion of the mechanism in position for the insertion of the next screw. Meanwhile, the contraction of the treadle-spring still continuing, the main frame is rocked backward about its pivot $m$ in the supplemental standards, in so doing breaking up the contact forward between its stop $W^\times$ and the supports $F^\times$ upon the nose-lever, being aided thereto by the recoil of the spring E in so separating the frame and nose-lever, causing a reaction in the crooked lever, throwing the cut-off $I^\times$ across the wire screw, completely severing it, simultaneously operating the feed-gage to throw it back, as hereinbefore described, and re-establishing the contact behind between the screw-boss F and stop G; after which the nose-lever is tilted backward with the frame, (restoring to the former position the trip-lever and trip-pin—that is to say, retracting the latter again through its sleeve and reoscillating the former,) and in so doing is raised from the horn, and finally brought up against the bracket $n$ upon the standard, whereupon the reaction ends.

Having thus fully described my invention, I claim and desire to secure by Letters Patent of the United States—

1. The combination, in a screw-soling machine, of the continuously-rotating stud-frame T, the studs $a\ a$, and the frame-spring $a^\times$, essentially as and for the purposes specified.

2. In combination with a wire-containing spindle, U, provided with perforations passing inward to its hollow core, studs $a\ a$, passing into and through said perforations, and adapted to bite direct upon the wire, essentially as shown and described.

3. The segmental stud-frame T and attachments, in combination with an operating device serving simultaneously to effect the clutching of the wire and its advance to and entrance through the stock, essentially as described.

4. In an organized machine, the combination, with mechanism for carrying, threading, inserting, and cutting off wire, essentially as and for the purpose described, of other mechanism—viz., detaining-bar $N^\times$, trip-lever $K^\times$, trip-pin $L^\times$, latch-trip N, and composite lever L M O, constructed and operated as specified, all working automatically in connection with the former, to so regulate the action of such former mechanism as to cause its complete operation to be proportionately more quickly performed when directed to the union of thin stock than to that of thick, substantially as described.

5. The combination, with a fixed or removable beveled surface upon the nose-lever C, (of obliquity corresponding with the desired pitch of the thread and provided with gains $J^\times\ J^\times$,) of a chaser-cap, $r$, to receive the chaser $s$, substantially as specified.

6. The combination, in a screw-soling machine, of a beveled surface and channel, $f^\times$, upon the nose-lever, a chaser, $s$, conforming to the channel, as described, a chaser-cap, $r$, and a set-screw, $t$, for adjustment, essentially as described.

7. The chaser $s$, in combination with the channel $f^\times$, constructed, as specified, for easy adjustment.

8. The combination of the latch-lever L, latch M, and carrier-lever O, forming together, when locked, a single composite lever, to transmit the force exerted by the treadle through its rod to the link Q, as and for the purposes specified.

9. The combination of the nose-lever C and the frame D with each other, and with the composite lever formed by the latch-lever, latch, and carrier-lever, to effect an automatic pressing, and, in connection with the treadle-spring $V^\times$, an automatic releasing, action upon the stock, essentially as described.

10. The combination of the nose-lever C and frame D with the crooked actuating-lever $G^\times$, to operate said lever, as described.

11. The crooked lever $G^\times$, pivoted to and operated, as described, by the nose-lever C and frame D, in combination with a spring-detent, $H^\times$, a cut-off, $I^\times$, and a feed-gage device, $O^\times$, and operating both to release said detent, so as to set free the wire griping, inserting, and regulating mechanism, to actuate said cut-off and to control said feed-gage device, substantially in the order and manner specified.

12. The combination of the composite lever L M O with the treadle-rod K and treadle J, to operate the entire mechanism, essentially as described.

13. The detent $H^\times$, in combination with the lever $G^\times$ and spring $i$, to alternately release and support the link Q, as specified.

14. The composite lever L M O, in combination with the link Q, to operate the carrier R.

15. In combination, the link Q, carrier R, and carrier-stem S, forming an intermediate composite power-transmitting device between the composite lever L M O and the wire griping and inserting mechanism, essentially as described.

16. The carrier-stem S, constructed and adjusted as specified, and operating as a single device, in combination with the frame T and its attachments and spindle U, to seize, rotate, advance, and insert wire at a single action, essentially as described.

17. In a screw-soling machine, the combination of the regulating-spindle A, rotatably supported in and carried by the carrier-sleeve X, and adapted to be rotated in the manner described, with the fixed nut $C^\times$ upon the main frame D, to form a regulating device for determining the rapidity of entrance of the screw-threaded wire into the stock, essentially as described.

18. The combination of the driving-pulley V, pinion W, and wire-containing spindle U with the cage Z, head $e$, and differential gear-wheel Y, to clutch and rotate by its head $d$ the regulating-spindle $A^\times$, through its fixed nut $O^\times$, when themselves put into action, substantially in the manner and to the end set forth.

19. The combination of the regulating-spindle $A^\times$, gear-wheel Y, and pinion W, to regulate proportionately the rapidity of descent of the screw-threaded wire, and the rate of its rotation, substantially as set forth.

20. The combination of the carrier R and carrier-stem S with the stud-frame T and attachments, wire-containing spindle U, pinion W, driving-pulley V, cage Z, head $e$, gear-wheel Y, and regulating-spindle $A^\times$, constituting, when put into action, a single operative device, adapted with a single motion to seize, advance, and insert wire, and to regulate the rapidity of such insertion, and, consequently, the number and pitch of the threads, essentially as described.

21. The standard $q$, carrying the pulleys $p$ $p$, and attached to and vibrating with the frame D, to keep the driving-belt $o$ $o$ taut about the driving-pulley V at any inclination of the frame, and at any height of the driving-pulley, substantially as described.

22. In combination with the nose-lever C, a feed-gage, consisting of an adjustable toothed face-piece, $O^\times$, a sliding bar, $j$, controlled by a lever, $G^\times$, set by a spring, $u$, and limited in its throw by two gage-studs, $v$ $v'$, to operate substantially as described.

23. The gage-bar $O^\times$, adjustable as to length, and operating automatically to determine the space between the screws and their distance from the edge of the stock.

24. A one-piece work-supporting horn, provided with two work-supporting surfaces, and so pivotally adjusted that the same action which throws one of such surfaces into plane beneath the axis of the wire-containing spindle will throw the other completely out of plane, and vice versa, substantially as described.

25. The combination of the one-piece work-supporting horn $Q^\times$, constructed and pivotally adjusted as described, with a rotating upright, $U^\times$, substantially as described.

26. The combination, with mechanism for carrying, threading, inserting, and cutting off wire, of a one-piece work-supporting horn, provided with two work-supporting surfaces, and so pivotally adjusted that the same action which throws one of such surfaces into plane beneath the axis of the wire-containing spindle for the insertion of wire will throw the other surface completely out of plane, and vice versa, substantially as described.

27. The combination of the horn $Q^\times$, lock $T^\times$, and shelves $y$ $y$, as and for the purpose specified.

28. The combination of the nose-lever C with the pivoted horn $Q^\times$, constructed as specified, to present heel or sole surfaces to the pressure of the nose-lever C.

29. The combination of the nose-lever C, trip-lever $K^\times$, detaining-bar $N^\times$, and standard A with the trip-pin $L^\times$, to elevate the trip-pin proportionately to the forward descent of the nose-lever, substantially as specified.

30. The combination of the trip-pin $L^\times$ with the latch N, approximately central between the fulcrum $c^\times$ of the latch-lever and the link Q, to trip the latch at the moment when the screw has been completely entered through the stock, substantially in the manner specified.

31. The combination, in a screw-soling machine, with mechanism for carrying, threading, inserting, and cutting off wire, of other mechanism to elevate the trip-pin $L^\times$, whereby the distance between the trip-pin and knob on latch-trip is made proportionate to the distance between the nose and the horn, to determine the length of time to be occupied in an action, which varies with the thickness of stock, and to determine the length of the screw, essentially as described.

32. The combination of the stop $W^\times$ upon the frame D with the supports $F^\times$ upon the nose-lever C, to arrest the action of the frame D and lever $G^\times$, essentially as and for the purposes specified.

33. The combination, to effect relative stoppage of the treadle, of the rod K, latch-lever L, stop $d^\times$, and latch-trip N with the pin $L^\times$, trip-lever $K^\times$, bar $N^\times$, and standard A, operating as specified.

In testimony whereof I have hereunto signed my name.

CHARLES TYSON.

In the presence of—
   J. BONSALL TAYLOR,
   O. B. MORRIS.